FIG.I.

INVENTOR
Charles A. Neuendorf

BY John J. Mulrooney
ATTORNEY
AGENT

INVENTOR
Charles A. Neuendorf

United States Patent Office 3,452,354
Patented June 24, 1969

3,452,354
EXPANDED CONICAL AND NAVIGATIONAL
SCAN SIMULATOR
Charles A. Neuendorf, 4452 Paola Way,
San Diego, Calif. 92117
Filed Mar. 29, 1968, Ser. No. 717,232
Int. Cl. G01s 7/40
U.S. Cl. 343—17.7       6 Claims

ABSTRACT OF THE DISCLOSURE

A signal scan simulator generates a plurality of modulating signals which are used to selectively modulate a radar carrier signal. The modulated signal simulates a pulse modulated radar having antenna scan modulation equivalent to conical, circular, sector, or track-while-scan modulation types.

BACKGROUND

Field of the invention

The present invention pertains generally to reflected or returned radio wave systems, and more particularly to an improved system for testing and calibrating radar warning systems such as aircraft ECM systems. ECM systems comprise warning receivers capable of detecting threat radiations of enemy radar transmitters and jamming transmitters capable of generating radiations intended to render the enemy radar ineffective or inoperative. In order to determine whether the ECM warning receiver is operating properly it is desirable to generate test signals which simulate the signals which would be detected by warning receivers under actual operating conditions. Likewise, means are needed to test the proper response from the jamming transmitter upon the reception of such simulated threat radiations. The present test set is a completely integrated system for performing an end-to-end check on an ECM warning receiver and jamming transmitter. Thus the test system generates and transmits to the warning receiver pulse RF signals simulating radar signals and receives in response from the jamming transmitter a deception signal for evaluation.

Description of the prior art

Prior art apparatus for testing ECM systems was limited to individual test components which were used to separately test and calibrate the warning receiver and jamming transmitter. Also, prior test apparatus was limited in the number of different threat radar signals which could be simulated. The present invention integrates the apparatus necessary for the complete testing and calibrating of an ECM system into a single unit which is capable of simulating a plurality of pulse modulated radars.

SUMMARY

The ECM system of the present invention comprises X and S-band carrier frequency generators; individual modulation signal generation circuits for generating modulating signals indicative of circular, conical, track-while-scan and sector scan modulation type signals; a modulator; switching control circuits for selectively connecting the desired scan simulation modulating signal to a carrier signal; a transmitting antenna for radiating the simulated threat radar signal and a receiving antenna for capturing the jamming signal; and test equipment for determining the ECM system performance.

DESCRIPTION OF THE PREFERRED EMBODIMENT

Figure 1:
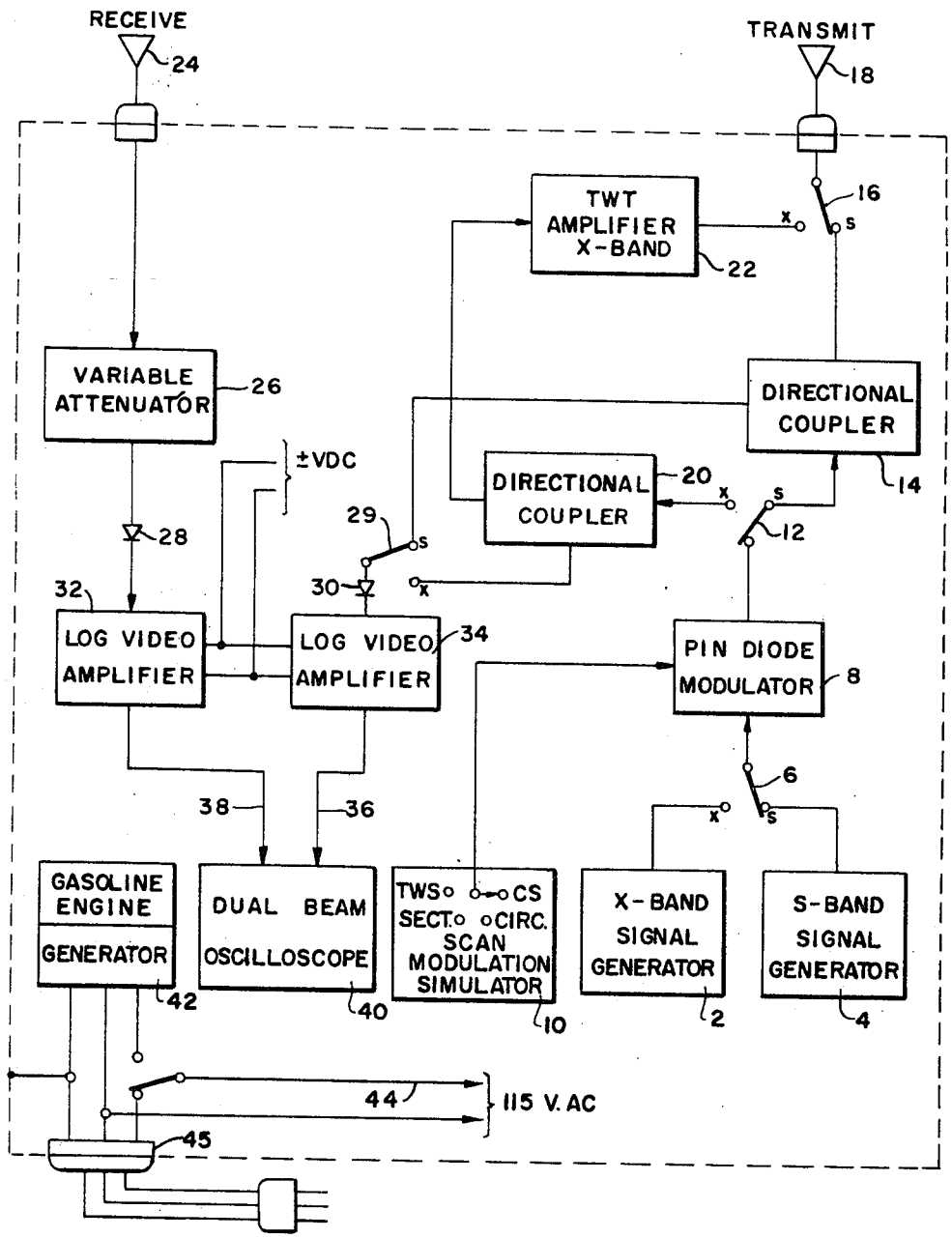
FIGURE 1 is a block diagram of the test system.
Figure 2:
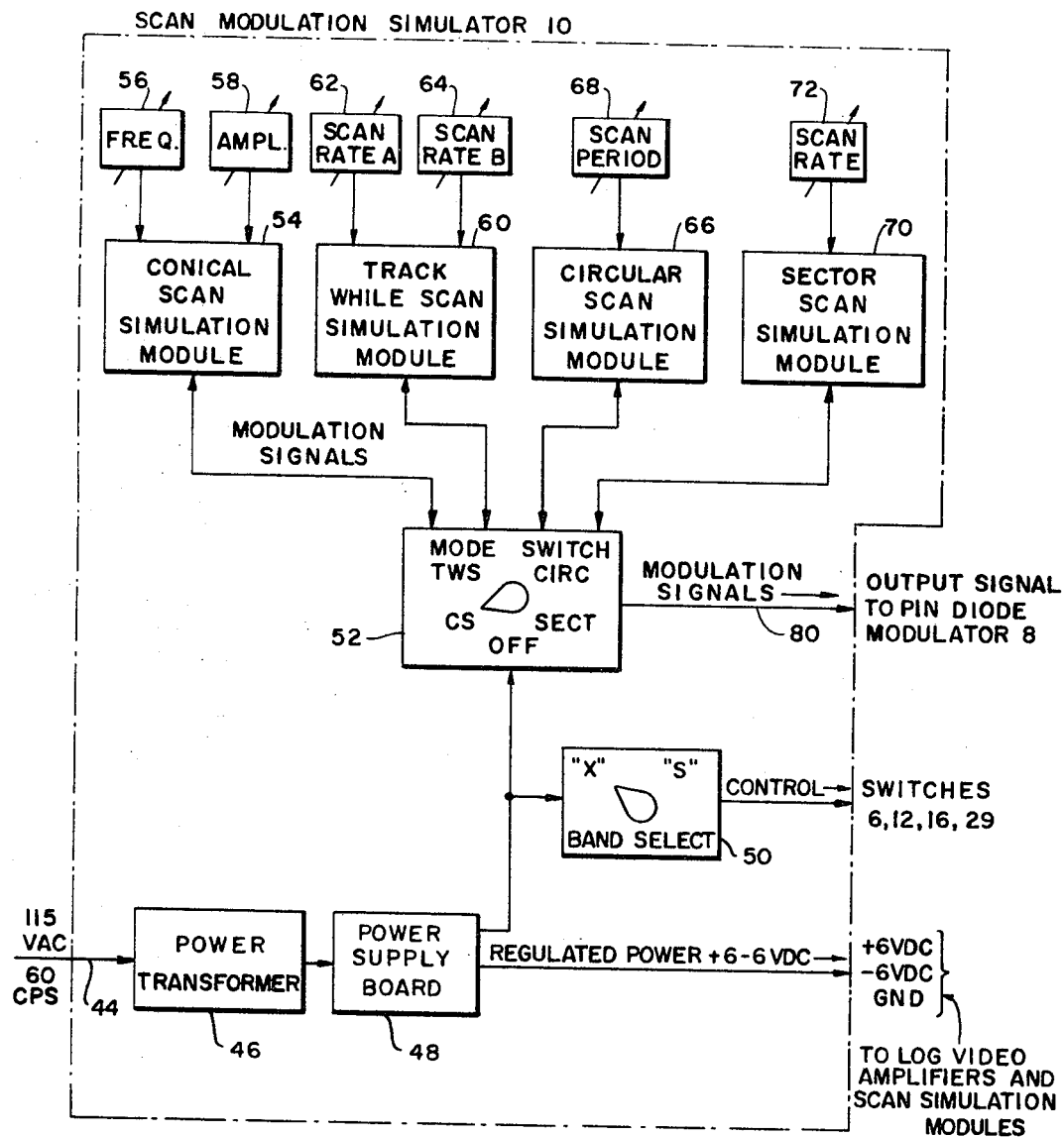
FIGURE 2 is a block diagram of the scan modulation simulator.

Referring to FIGURE 1, a block diagram of one embodiment of the ECM test system of this invention is shown. The system includes X and S-band carrier frequency generators 2 and 4 whose outputs are selectively coupled through switch 6 to pin-diode modulator 8. The pin-diode used here is a broadband, continuously variable, current controlled attenuator. Scan modulation simulator 10 generates a plurality of modulation signals which are fed to pin-diode modulator 8. The modulation envelope imparted to the carrier signal is determined by mode switch 52 (FIGURE 2). The carrier signal can be selectively modulated in any one of a plurality of modes which are characteristic of radar antenna scan modulation systems. Four representative types of antenna scan modulation are available in this present embodiment: conical, circular, sector, and track-while-scan (TWS). After modulation, the carrier signal has the characteristics of a scan modulated signal and it is fed to a spiral transmitting antenna 18 over one of two paths as determined by the band select switch 50 (FIGURE 2). If the S-band generator is in use, then switches 6, 12, 16 and 29 are in the S-mode and the scan modulation signal is fed through directional coupler 14 to antenna 18. If the X-band generator is in use, the switches are in the X-mode and the scan modulation signal is fed through directional coupler 20 and traveling-wave tube amplifier 22 to antenna 18. The TWT amplifier is required to make the X-band output comparable in magnitude to the S-band output. The directional couplers 14 and 20 also pass part of the scan modulation signal to switch 29, crystal detector 30, log-video amplifier 34, and finally to one set of vertical plates on a dual beam oscilloscope 40.

The above described elements of the test system generate and transmit radar signals which simulate antenna scan modulation signals which an aircraft ECM system might detect. The function of the remaining system apparatus is to receive and evaluate the deception signal generated by the ECM system under test. The incoming deception or jamming signal is captured by a spiral type receiving antenna 24 and passed through a variable attenuator 26. Aircraft radar transmitters are relatively high-powered and the test system contains attenuator 26 to reduce the strength of these jamming signals to a useable level. After attenuation the deception signals are demodulated by crystal detector 28, amplified in log-video amplifier 32 and then applied to the second pair of vertical deflection plates of the dual beam oscilloscope 40. Comparison of the two oscilloscope traces enables the operator to analyze and evaluate the performance of the ECM system under actual operating conditions.

The operating power for the test system may be obtained from the integral engine-generator set 42 or from any available power supply through connection 45. The engine-generator set makes the test system completely portable for use where no regular power supplies are usually available such as an aircraft flight line.

Referring to FIGURE 2, a block diagram of the scan modulation simulator 10 is shown. Simulator 10 comprises a power transformer 46 and a power supply board 48 for energizing the band select switch 50 and the mode select switch 52. Simulator 10 also houses the various scan modulation modules 54, 60, 66 and 70 which generate the modulating signals. Band select switch 50 permits the connection of either the X-band or the S-band carrier signal generators to pin-diode modulator 8 through switch 6. Bandselect switch 50 also controls the position of switches 12, 16 and 29. Mode switch 52 permits the selection of a particular type of antenna scan modulation. Mode switch 52 applies energizing power to a selected scan simulation module and selectively routes the modulation signal output to pin-diode modulator 8.

Figure 3:
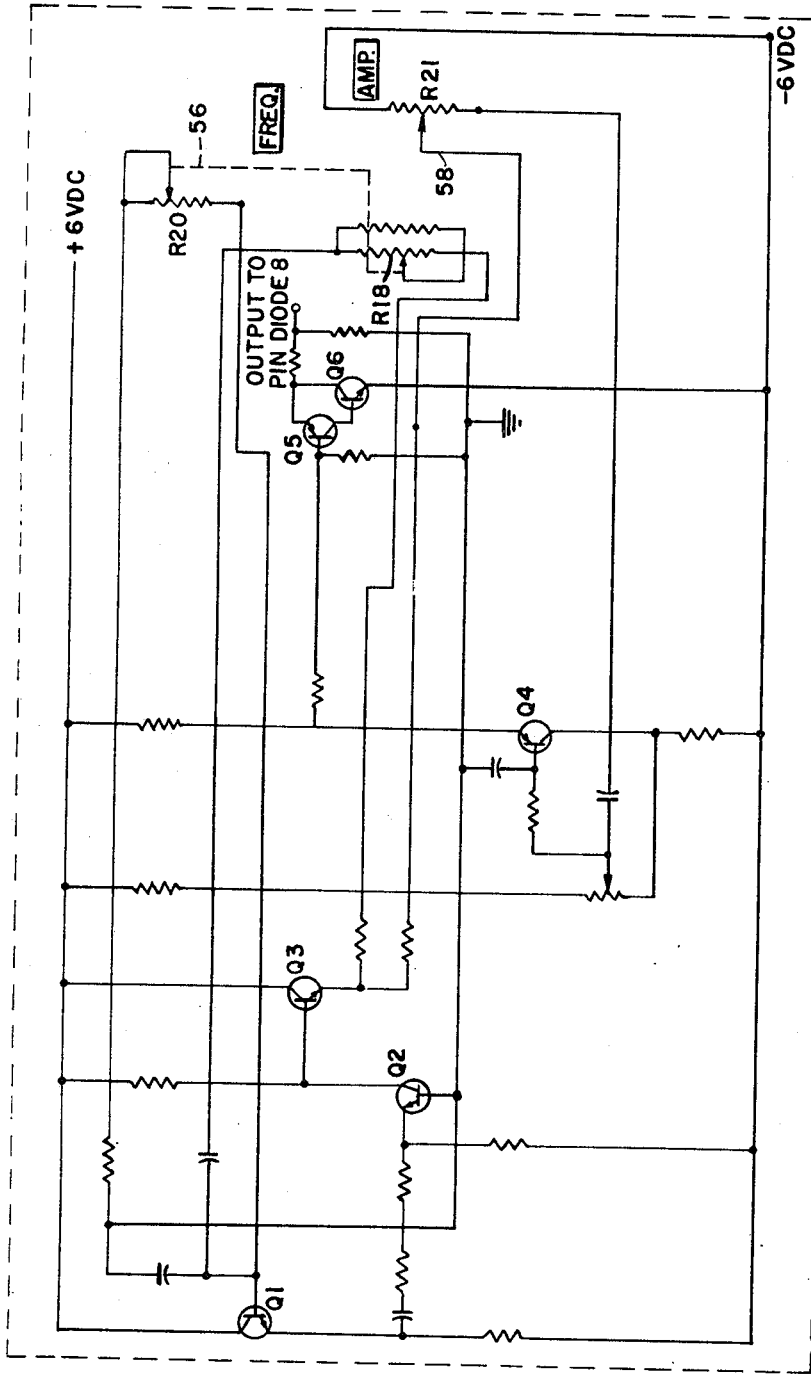
FIGURES 3-6 are schematic diagrams of the various scan simulation modules.

Referring to FIGURE 3, a schematic diagram of the conical scan modulation signal circuit 54 is shown. This modulation signal circuit essentially comprises four transistors, Q1, Q2, Q3 and Q4, arranged as a wein-bridge oscillator with an emitter follower pin-diode driver output stage Q5 and Q6. The modulating output from module 54 is essentially a sine wave. The amplitude of this sine wave is controlled by varying arm 58 of potentiometer R21. The sine wave frequency is controlled by varying the mechanically ganged arms 56 of potentiometers R18 and R20. The conical scan simulation output can be selectively fed to modulator 8 to produce a sine wave modulation envelope on the carrier signal which is characteristic of antenna conical scan modulation.

Figure 4:
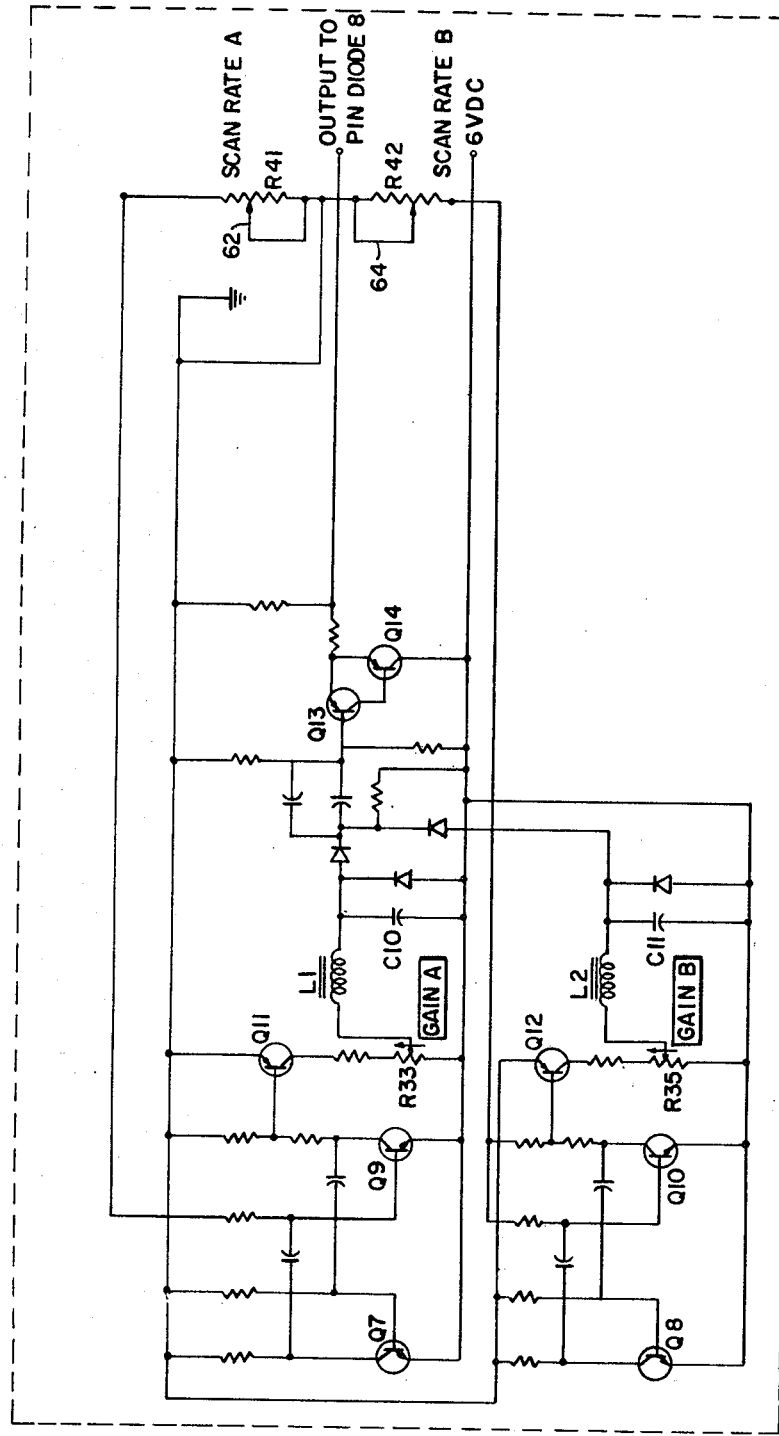

Referring to FIGURE 4, a schematic diagram of the track-while-scan simulation circuit 60 is shown. The TWS circuit essentially comprises two identical multivibrator circuits, Q7–Q9 and Q8–Q10, each having a separate frequency control denoted as SCAN RATE A, 62, and SCAN RATE B, 64, respectively. The multivibrators are followed by inverter amplifiers, Q11 and Q12, whose outputs are supplied to shaping networks L1–C10 and L2–C11 respectively. Each multivibrator has a separate gain control denoted as GAIN A or GAIN B. In operation, the shaper circuits receive series of pulses from the multivibrators and convert these pulses into signals which are essentially a series of half sine waves. By half sine wave is meant the first 180° of a standard sine wave. Each scan consists of approximately five side-by-side half sine waves. The amplitudes of these half sine waves vary by a common multiple from smallest at the ends to largest in the middle, with the two end waves being of equal amplitude as are the waves adjacent to the end waves. The middle, largest wave may be compared to the main lobe of a regular TWS antenna scan radar. These half sine wave signals are fed to an emitter-follower pin-diode driver, Q13 and Q14, which is common to both multivibrator circuits. The TWS simulation output can be selectively fed to modulator 8 to produce a modulation envelope having the shape of a series of half sine waves on the carrier signal which is characteristic of antenna track-while-scan modulation.

Figure 5:
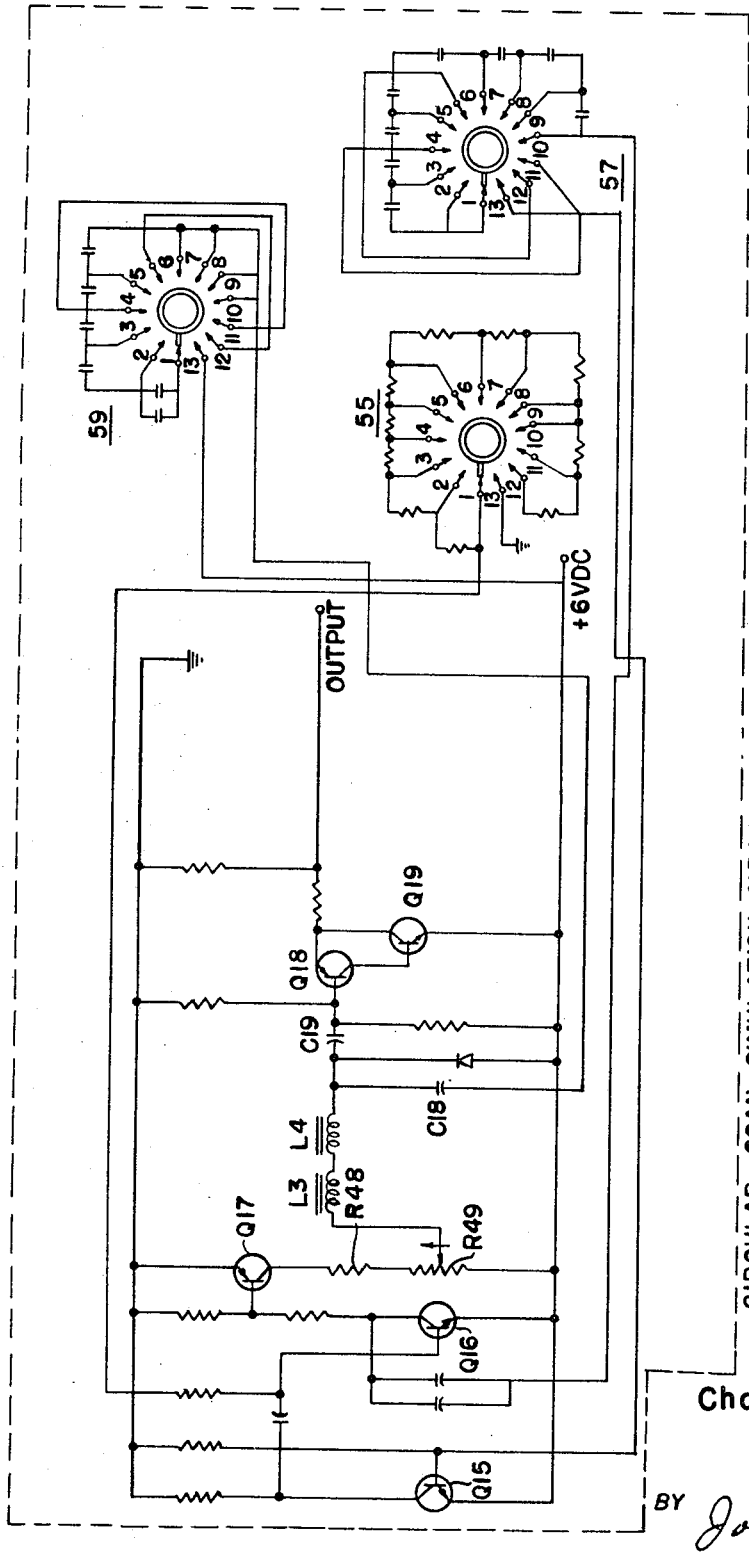

Referring to FIGURE 5, a schematic diagram of the circular scan simulation circuit 66 is shown. The circuit essentially comprises a multivibrator Q15 and Q16, an inverter-amplifier Q17, a shaping circuit L3, L4, C18 and C19, and an emitter follower pin-diode driver Q18 and Q19. The output signal level is controlled by potentiometer R49 located in the collector circuit of transistor Q17. The frequency of the multivibrator is controlled by a SCAN PERIOD multiposition rotary switch 55. Multiposition switches 57 and 59 control the modulation signal pulse width. The output from the circular scan simulation circuit 66 consists of series of half sine waves similar to the output from TWS simulation circuit 60. However, the half sine waves in the output from circuit 66 are not related to each other by any one multiple. Thus, in a scan output consisting of five half sine waves, the second and fourth waves would be of equal size but they may be twice as large as the first and fifth waves while the middle, largest wave might be five times larger than the second and fourth waves. The circular scan simulation output can be selectively fed to modulator 8 to produce a modulation envelope having the shape of a series of half sine waves on the carrier signal which is characteristic of antenna circular scan modulation.

Figure 6:
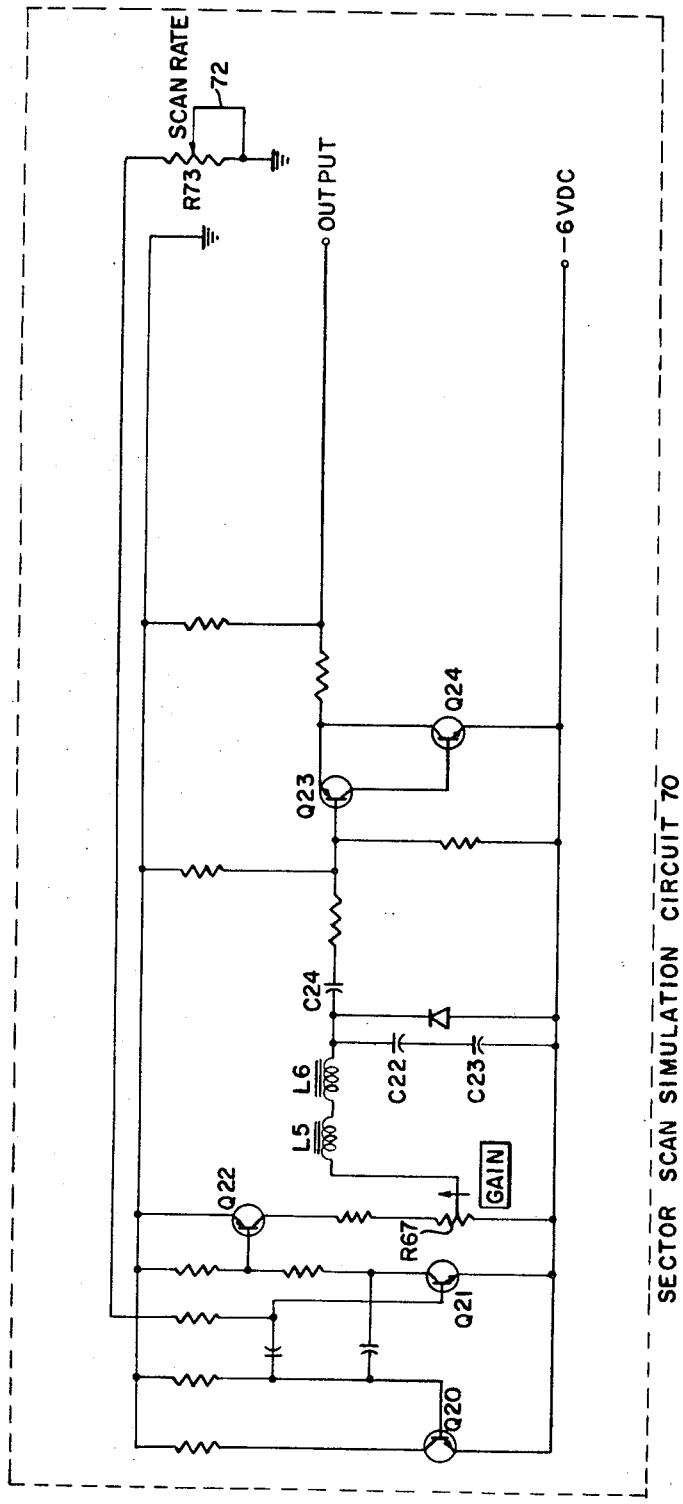

Referring to FIGURE 6, a schematic diagram of the sector scan simulation circuit is shown. The circuit essentially comprises a multivibrator Q20 and Q21, an inverter-amplifier Q22, a shaping circuit L5, L6, C22, C23 and C24, and an emitter follower pin-diode driver Q23 and Q24. The output signal level is controlled by arm of GAIN potentiometer R67. The frequency of the multivibrator is controlled by a SCAN RATE potentiometer R72. The output from the sector scan simulation circuit 70 consists of a series of half sine waves identical to the output from circular scan simulation circuit 66 except in one particular. The scan or transmitted pulse width is much shorter for the sector scan simulation circuit. The sector scan simulation output can be selectively fed to modulator 8 to produce a modulation envelope having the shape of a series of half sine waves on the carrier signal which is characteristic of antenna sector scan modulation.

I claim:
1. An antenna scan modulation generator for testing ECM systems comprising:
   (a) signal generating means for generating RF signals;
   (b) scan modulation simulator means for generating a plurality of antenna scan modulating signals;
   (c) means for modulating said RF signals with said modulating signals to produce antenna scan modulation signals;
   (d) transmitting antenna means;
   (e) coupling means for passing a portion of said antenna scan modulation signals to said transmitting antenna means for radiation at an ECM system under test;
   (f) dual beam oscilloscope means having first and second pairs of deflection plates;
   (g) means including a detector and an amplifier for feeding a demodulated-amplified portion of said antenna scan modulation signals to said first pair of deflection plates;
   (h) receiving antenna means for detecting a radar jamming signal; and
   (i) means including a demodulator and an amplifier for feeding said received radar jamming signal to said second pair of deflection plates so that the ECM system performance can be evaluated.

2. An antenna scan modulation generator as described in claim 1 wherein said scan modulation simulator comprises a conical scan simulation circuit having a wein-bridge oscillator with output amplitude and frequency control means to generate a modulating signal to produce a modulation envelope which is characteristic of antenna conical scan modulation signals.

3. An antenna scan modulation generator as described in claim 1 wherein said scan modulation simulator comprises a track-while-scan simulation circuit having a pair of multivibrator circuits with frequency control means to generate a modulating signal to produce a modulation envelope which is characteristic of antenna track-while-scan modulation signals.

4. An antenna scan modulation generator as described in claim 1 wherein said scan modulation simulator comprises a circular scan simulation circuit having a multivibrator circuit arranged to generate a modulating signal to produce a modulation envelope which is characteristic of antenna circular scan modulation signals.

5. An antenna scan modulation generator as described in claim 1 wherein said scan modulation simulator comprises a sector scan simulation circuit having a multivibrator oscillator arranged to generate a modulating signal to produce a modulation envelope which is characteristic of antenna sector scan modulation signals.

6. An antenna scan modulation generator as described in claim 1 wherein said modulating means comprise a pin-diode modulator.

References Cited

UNITED STATES PATENTS

| | | | |
|---|---|---|---|
| 3,219,744 | 11/1965 | Mazziotti et al. | 343—17.7 X |
| 3,320,349 | 5/1967 | Pollack et al. | 343—17.7 X |

RICHARD A. FARLEY, *Primary Examiner.*

T. H. TUBBESING, *Assistant Examiner.*